Feb. 4, 1941.  B. HARVEY ET AL  2,230,837
BRAKE
Filed Nov. 20, 1939
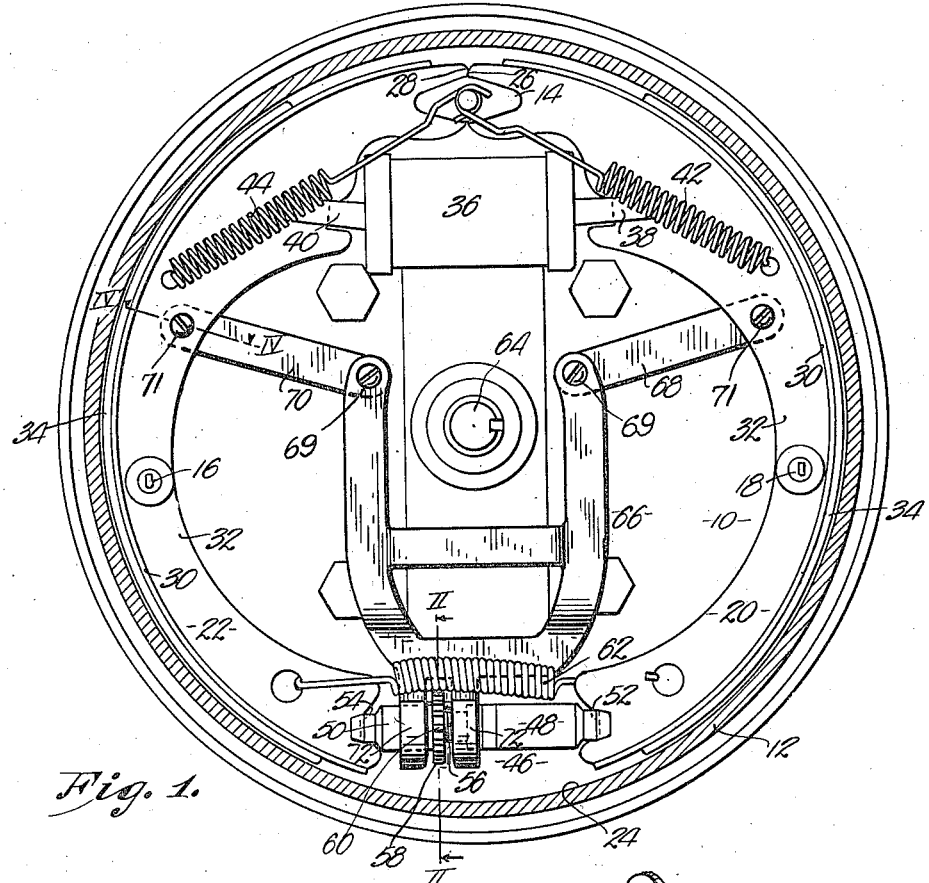
Fig. 1.
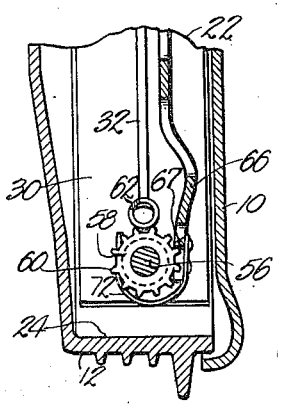
Fig. 2.
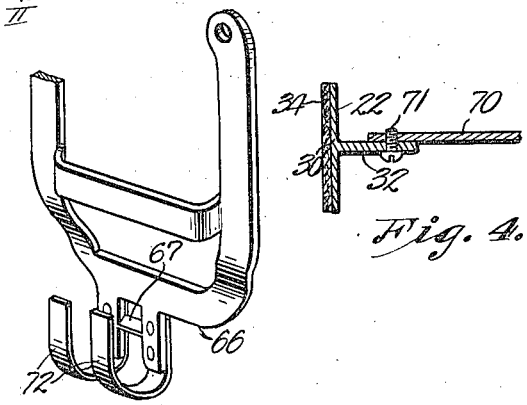
Fig. 3.
Fig. 4.
INVENTORS,
Boyd Harvey,
Herbert S. Putney.
BY
Hovey & Hamilton,
ATTORNEYS.

Patented Feb. 4, 1941

2,230,837

UNITED STATES PATENT OFFICE 2,230,837

BRAKE

Boyd Harvey and Herbert S. Putney,
Topeka, Kans.

Application November 20, 1939, Serial No. 305,237

5 Claims. (Cl. 188—79.5)

This invention relates to improvements in brakes and particularly to automatic adjusting means for internal expanding brakes.

Efforts have been made to provide an automatic means to maintain a substantially equal distance between the brake shoes and the brake drum of an internal expansion brake, by mounting the means partly on the backing plate and partly on the shoe mechanism, this has proven impracticable because of the relative movement between the supporting parts.

The principal object of this invention is to overcome the above defects and to provide an efficient and simple means for automatically adjusting the brake bands as the brake lining wears away, whereby there will be maintained a substantially constant clearance between the brake bands and drum when the brake is off, thereby eliminating the necessity of manual adjustment of the parts during the life of the brake lining.

Another object of the present invention is the provision of means for automatically adjusting internal expanding brakes wherein the means is mounted entirely on the brake shoe assembly.

Further objects are economy and efficiency of construction, and adaptability to substantially all of the present types of automobile brakes now in general use.

Reference will now be had to the drawing wherein:

Figure 1 is a vertical sectional view of a brake of the two-shoe type, looking toward the fixed support or backing plate and the automatic adjusting means embodying this invention.

Fig. 2 is a fragmentary sectional view taken on line II—II of Fig. 1.

Fig. 3 is a fragmentary perspective view of the operating yoke; and

Fig. 4 is a fragmentary sectional view taken on line IV—IV of Fig. 1.

Throughout the several views, like reference characters refer to similar parts and the numeral 10 is a fixed support or back plate.

Associated with the back plate is a rotatable drum 12 which may be secured to a wheel (not shown). Positioned on the back plate is an anchor 14 and steady rests 16 and 18, upon which the brake shoes 20 and 22 are loosely mounted for cooperation with the braking face 24 of drum 12. The adjacent ends of shoes 20 and 22 have shoulders 26 and 28 notched to engage anchor 14 for movement relative thereto. The shoes are of the conventional type, each having a rim 30 and a web 32.

A suitable lining 34 is secured to each shoe and is normally spaced apart from the braking surface 24 of the brake drum when the brake is off, and is adapted to be moved to braking contact with the drum by means of the hydraulic cylinder 36, which is connected respectively with shoes 20 and 22 by means of links 38 and 40. Springs 42 and 44, secured at their one end to anchor 14 and at their other end to shoes 20 and 22 respectively, operate to return the shoes to the off position after the hydraulic pressure has been released.

The articulated ends of shoes 20 and 22 are joined together by a suitable adjusting device 46, comprising a pair of bifurcated members 48 and 50, which rest in notches 52 and 54 respectively, formed in the end portions of the shoes. A screw 56 securely carried by member 48 extends loosely into member 50 and is provided with an adjusting nut 58 having a toothed periphery 60 operable to spread the two members 48 and 50 apart to expand the articulated ends of the shoes 20 and 22 and move the lining 34 closer to the braking surface 24. An expansion spring 62 secured at its opposite end to shoes 20 and 22 respectively rests between teeth on nut 58, thus securing the nut against accidental movement on the screw 56.

It has been the general practice to manually adjust nut 58 to position the brake shoes in proper relation to drum 12. The brake pedal operable to set the brake is usually adjusted to set the brake shoes with a very much shorter stroke, but as the brake lining wears away, this stroke increases and eventually the brake pedal strikes the floor-board and the brake cannot be properly set. It is at this time that the mechanic usually adjusts nut 58 to correct the defect and properly position the shoes relative to the drum. Referring to Fig. 1, it will be noted that the drum and the shoes are mounted concentrically with wheel spindle 64.

The above described type of brake is now in general use and it is the object of this invention to provide automatic means, operable by this brake mechanism, to maintain a substantially predetermined space between the brake lining and the drum when the brake is off. This is accomplished by the following mechanism:

An inverted A-shaped yoke 66, interconnected by links 68 and 70 pivotally connected to the upper portions of shoes 20 and 22 respectively, extends downwardly and is provided with transversely disposed U-shaped resilient members 72 which engage members 48 and 50 respectively, to maintain the yoke in spaced apart relation to the backing plate 10. The links 68 and 70 are connected by means of screws 69 to the yoke 66 and by screws 71 to shoes 20 and 22 for free pivotal movement of the related parts. A detent 67 integral with the yoke 66, is adapted to engage the teeth of the adjusting nut 58 and cause the nut to be rotated one tooth whenever the wear of the brake lining becomes sufficiently worn to cause a lifting of yoke 66 a sufficient distance to drop into engagement with the nut-tooth thereabove, when the brake is set.

It is apparent that as the brake shoes are moved apart during radial outward expansion thereof by the action of the hydraulic cylinder, the links 68 and 70 will be straightened on their pivots to accommodate the separation of the shoes and will tend to raise yoke 66, causing the detent 67 carried by yoke 66 to ride over the adjacent tooth of adjusting nut 58, due to the resiliency of members 72, and then snap into engagement with the upper side of said tooth. When the shoes are again moved to the retracted position by springs 42 and 44, yoke 66 will be forced downwardly and cause nut 58 to be rotated one tooth, thus forcing the shoes closer to drum 12. When the brake is again set, the movement of yoke 66 will not be sufficient to operatively engage the next tooth of the adjusting nut 58 so there will be no further adjustment of the shoes until such time when the brake lining has been worn sufficiently to cause a movement of nut 58 as described above.

Due to the frictional engagement of nut 58 by spring 62, which rests on the nut and serves to maintain the articulated relation of the shoe members, the nut is not rotated by the upward movement of the ratchet bar 66 thereover.

Since brake shoes have the same general movements to and from the braking position, it is not material to the present invention, as to just what type of setting means is used. A mechanically, cam set brake would be just as applicable as is the hydraulic type shown.

Attention is called to the fact that no part of yoke or its connecting elements, contact or are they in any manner supported by backing plate 10. This is a very important feature of the present invention, in that it precludes all possible interference with the adjusting apparatus, due to the relative movement of the back plate and the shoes.

It is apparent that there will be a slight rocking of the yoke as the nut is moved along the screw, however, this movement will not be sufficient to materially affect the action of the device; furthermore, the resilient member 72 positioned at opposite sides of nut 58 precludes displacement of the part and the detent 67 will always be in proper position relative to the teeth on the periphery of the nut 58.

Although this invention has been described in connection with specific structure shown in the drawing, yet the structure involved is susceptible of various changes without departing from the spirit of the invention and it is desired to be limited only by the scope of the appended claims.

Having thus described the invention, what is claimed as new and desired to be secured by Letters Patent is:

1. A brake comprising a drum; a backing plate; a pair of brake shoes carried by said backing plate; resilient means to normally maintain said shoes in spaced relation to said drum; means positioned between adjacent ends of said shoes operable to force the shoes against said drum; adjustable means positioned between the opposite adjacent ends of said shoes for adjusting the shoes relative to said drum; and means carried by said shoes in spaced relation to said backing plate operable in a rectilinear direction upon release of the shoes by said resilient means to move said adjusting means to maintain said shoes in a substantially predetermined spaced apart relation relative to said drum when in the off position.

2. A brake comprising a drum, a backing plate; a pair of brake shoes mounted on said backing plate, each having a web parallel with said backing plate; means operable to force apart adjacent ends of said shoes whereby said shoes are forced against said drum; adjustable means positioned between the opposite adjacent ends of said shoes to vary the distance therebetween; a yoke connected by links to each of said webs whereby when said shoes are forced against said drum, said yoke will be moved substantially diametrically of said drum; and means carried by said yoke operable upon the release of the shoes and as the yoke is moved in the reverse direction diametrically of said drum, whereby said adjustable means is operated to force apart the adjacent end of said shoes and maintain a substantially constant distance between the shoes and the drum when the brake is off.

3. A brake comprising a brake drum; a backing plate; a pair of brake shoes carried by said backing plate; resilient means for normally maintaining said shoes in spaced relation to said drum; means positioned between certain adjacent ends of said shoes operable to force said shoes against said drum; adjustable means operable to vary the distance between the other adjacent ends of said shoes; a yoke interconnected by means of a link to each of said shoes whereby when said shoes are forced against said drum the yoke will be moved substantially diametrically of said drum; and detent means associated with said yoke operable to maintain the distance between said shoes and drum within predetermined fixed limits when the brake is off.

4. A brake comprising a brake drum; a backing plate; a pair of brake shoes carried by said backing plate; resilient means for normally maintaining said shoes in spaced relation to said drum; means positioned between certain adjacent ends of said shoes operable to force said shoes against said drum; adjustable means operable to vary the distance between the other adjacent ends of said shoes; a yoke interconnected by means of a link to each of said shoes whereby when said shoes are forced against said drum the yoke will be moved substantially diametrically of said drum; and detent means adapted to be positioned by said yoke to engage said adjustable means whereby said resilient means will upon release of the shoes operate said adjustable means to force apart the other adjacent ends of said shoes to take up the wear of said brake.

5. A brake comprising a brake drum; a backing plate; a pair of brake shoes carried by said backing plate; resilient means for normally maintaining said shoes in spaced relation to said drum; means positioned between certain adjacent ends of said shoes operable to force said shoes against said drum; adjustable means operable to vary the distance between the other adjacent ends of said shoes; a yoke interconnected by means of a link to each of said shoes whereby when said shoes are forced against said drum the yoke will be moved substantially diametrically of said drum; detent means adapted to be positioned to engage said adjustable means whereby said resilient means will upon release of the shoes operate said adjustable means to force apart the other adjacent ends of said shoes to take up the wear of said brake; and resilient means carried by said yoke adapted to engage said adjustable means to maintain the parts in operable relation.

BOYD HARVEY.
HERBERT S. PUTNEY.